(12) United States Patent
Faibish et al.

(10) Patent No.: US 8,589,550 B1
(45) Date of Patent: Nov. 19, 2013

(54) ASYMMETRIC DATA STORAGE SYSTEM FOR HIGH PERFORMANCE AND GRID COMPUTING

(75) Inventors: Sorin Faibish, Newton, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1967 days.

(21) Appl. No.: 11/551,943

(22) Filed: Oct. 23, 2006

(51) Int. Cl.
*G06F 15/173* (2006.01)
*G06F 17/30* (2006.01)

(52) U.S. Cl.
USPC ....... 709/226; 709/223; 709/225; 707/E17.01

(58) Field of Classification Search
USPC ........................................ 709/226
See application file for complete search history.

(56) References Cited

U.S. PATENT DOCUMENTS

| | | | |
|---|---|---|---|
| 6,101,508 A * | 8/2000 | Wolff | 709/223 |
| 6,324,581 B1 | 11/2001 | Xu et al. | |
| 6,389,420 B1 | 5/2002 | Vahalia et al. | |
| 6,453,354 B1 | 9/2002 | Jiang et al. | |
| 6,697,846 B1 | 2/2004 | Soltis | |
| 6,769,054 B1 | 7/2004 | Sahin et al. | |
| 6,775,679 B2 * | 8/2004 | Gupta | 1/1 |
| 6,823,349 B1 | 11/2004 | Taylor et al. | |
| 6,877,044 B2 * | 4/2005 | Lo et al. | 710/2 |
| 6,973,455 B1 | 12/2005 | Vahalia et al. | |
| 6,985,914 B2 | 1/2006 | Venkatesh et al. | |
| 7,062,675 B1 | 6/2006 | Kemeny et al. | |
| 7,103,797 B1 | 9/2006 | Wahl et al. | |
| 7,165,096 B2 * | 1/2007 | Soltis | 709/217 |
| 7,185,062 B2 | 2/2007 | Lolayekar et al. | |
| 7,213,113 B2 | 5/2007 | Sahin et al. | |
| 7,219,175 B1 | 5/2007 | Davis et al. | |
| 7,225,317 B1 | 5/2007 | Glade et al. | |
| 7,240,154 B2 | 7/2007 | Frangioso et al. | |
| 7,243,177 B1 | 7/2007 | Davis et al. | |
| 7,299,332 B1 | 11/2007 | Misra et al. | |
| 7,353,260 B1 * | 4/2008 | Senum | 709/217 |
| 7,383,463 B2 | 6/2008 | Hayden et al. | |
| 7,398,339 B1 | 7/2008 | Davis et al. | |
| 7,464,156 B2 * | 12/2008 | Amir et al. | 709/224 |
| 7,509,465 B1 | 3/2009 | Misra et al. | |

(Continued)

OTHER PUBLICATIONS

"An Ethernet Based Data Storage Protocol for Home Network", IEEE Transactions on Consumer Electronics, May 2004, Wang, et al.*

(Continued)

*Primary Examiner* — Linglan Edwards
(74) *Attorney, Agent, or Firm* — Richard Auchterlonie; Novak Druce Connolly Bove + Quigg LLP

(57) ABSTRACT

A data processing system includes compute nodes, at least one metadata server, iSCSI storage access servers, and data storage devices. The metadata server services requests from the compute nodes for file mapping information identifying iSCSI LUNs and logical blocks of file data. The storage access servers service iSCSI I/O requests from the compute nodes, and report server loading to the metadata server. A Gigabit Ethernet IP network transfers read and write data between the compute nodes and the storage access servers. The storage access servers are linked to the data storage devices for parallel access to iSCSI LUNs of the file data in the data storage devices. The metadata server is programmed for server load balancing by indicating to the compute nodes respective ones of the storage access servers that should be used for access to the iSCSI LUNs.

20 Claims, 10 Drawing Sheets

(56) References Cited

U.S. PATENT DOCUMENTS

| | | | |
|---|---|---|---|
| 7,509,645 B2* | 3/2009 | Coates et al. | 718/105 |
| 2004/0059822 A1 | 3/2004 | Jiang et al. | |
| 2005/0010682 A1* | 1/2005 | Amir et al. | 709/238 |
| 2005/0044162 A1 | 2/2005 | Liang et al. | |
| 2005/0114429 A1 | 5/2005 | Caccavale | |
| 2005/0157756 A1* | 7/2005 | Ormond | 370/474 |
| 2005/0210144 A1* | 9/2005 | Kumagai et al. | 709/229 |
| 2006/0041580 A1* | 2/2006 | Ozdemir et al. | 707/102 |
| 2006/0074925 A1 | 4/2006 | Bixby et al. | |
| 2006/0129695 A1 | 6/2006 | Faibish et al. | |
| 2006/0230148 A1 | 10/2006 | Forecast et al. | |
| 2007/0055702 A1 | 3/2007 | Fridella et al. | |
| 2007/0088702 A1 | 4/2007 | Fridella et al. | |
| 2007/0226224 A1* | 9/2007 | Wanigasekara-Mohotti et al. | 707/10 |
| 2008/0005468 A1 | 1/2008 | Faibish et al. | |

OTHER PUBLICATIONS

B. Welch et al., "pNFS Operations, draft-welch-pnfs-ops-02.txt," Internet Draft, Jun. 9, 2005, 47 pages, The Internet Society, Reston, VA.

Steve Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

EMC Celerra HighRoad, EMC White Paper, Jan. 2002, 13 pages, EMC Corporation, Hopkinton, MA.

Enginuity: The Symmetrix Storage Operating Environment, EMC White Paper, Jul. 2005, 21 pages, EMC Corporation, Hopkinton, MA.

10 Gigabit Ethernet, Technical Note, Dec. 2002, 22 pages, Anritzu Corporation, Tokyo, Japan.

Cisco MDS 9000 Family IP Storage Services Modules, Mar. 2006, 10 pages, Cisco Systems, Inc., San Jose, CA.

Intel Server Compute Blade SBX82, published before Aug. 25, 2006, 4 pages, Intel Corp., Santa Clara, CA.

Shiv Sikand and Roger March, "Highly Scalable, High Performance Perforce Server Environments," Perforce User Conference, May 8-9, 2003, Las Vegas, NV, 11 pages, Perforce Software Inc., Alameda, CA.

Sukwoo Kang and A. L. Narasimha Reddy, "Virtual Allocation: A scheme for flexible storage allocation," Proc. of OASIS workshop in conjunction with ASPLOS, Oct. 9-13, 2004, Boston, MA, 6 pages, Association for Computing Machinery, Washington, DC.

J. Menon et al., "IBM Storage Tank—A heterogeneous scalable SAN file system," IBM Systems Journal, vol. 42, No. 2, 2003, pp. 250-267, IBM Corporation, San Jose, CA.

S. Faibish et al., "Joint SAN and NAS architecture of Disk Based Storage for Media Applications", Proceedings of the 144th SMPTE Technical Conference and Exhibit, Pasadena, Oct. 23-26, 2002, Society of Motion Picture and Television Engineers, Exton, PA.

Wayne Rickard et al., "Shared Storage Model—A framework for describing storage architectures," Apr. 13, 2003, 41 pages, Storage Networking Industry Association, San Francisco, CA.

"Shared Storage Cluster Computing," Jan. 27, 2005, 22 pages, Panasas, Fremont, CA.

Object Storage Architecture: Defining a new generation of storage systems built on distributed, intelligent storage devices, White Paper, Oct. 19, 2003, 18 pages, Panasas Inc., Fremont CA.

Object Based Storage, 2003, 2 pages, Panasas Inc., Fremont CA.

* cited by examiner

ASYMMETRIC DATA STORAGE SYSTEM FOR HIGH PERFORMANCE AND GRID COMPUTING

FIELD OF THE INVENTION

The present invention relates to a data storage system for high performance and grid computing.

BACKGROUND OF THE INVENTION

Currently high performance and grid computing is performed by parallel processors. Applications include seismic data processing for oil exploration, climate modeling and weather forecasting, and other kinds of simulation programs.

A drawback of high performance and grid computing has been the rapid obsolescence of high-performance parallel processor systems. In the past, supercomputer development has been a driving force in advancing computer technology. Recently, however, major advances in processing power, storage, and network technology have been driven by world-wide demand for personal computers and high-speed Internet service. For example, inexpensive disk drives originally designed for personal computers are assembled into redundant storage arrays (RAID). Processor chips originally designed for high-end personal computers are assembled onto multi-processor computer blades offered as commodity items. The multi-processor computer blades are assembled into parallel processor systems or programmed to perform specific functions such as storage access servers and network switches.

A problem encountered when assembling a high-performance parallel processor from commodity processors is the scalability of asynchronous access to shared memory and storage. In particular, it is desired for the processors to access shared data at a higher level of abstraction than disk blocks in order to use conventional techniques for storage allocation and maintenance of coherency. In this fashion, the application programming for the parallel processor system can be independent of the hardware implementation. This provides for not only software portability but also incremental upgrading of the shared memory and storage.

Presently, storage vendors are attempting to extend standardized network file system access protocols to eliminate a single-server bottleneck to file access and achieve scalable sharing for file systems and individual files. Perhaps the most advanced extension is the parallel Network File System (pNFS) proposal specified in the Internet Draft by Welch et al. entitled "pNFS Operations draft-welch-pnfs-ops-02.txt" dated Jun. 9, 2005. The key feature of the proposal is said to be the ability for clients to perform read and write operations that go directly from the client to individual storage elements without funneling all such accesses through a single file server. The file server must coordinate the client I/O so that the file system retains its integrity. The extension adds operations that query and manage layout information that allows parallel I/O between clients and storage system elements. The layouts are managed in a similar way as delegations in that they have leases and can be recalled by the server, but layout information is independent of delegations. pNFS has several ways to access data in parallel using files, block devices and object storage devices.

The pNFS proposal is based on a file mapping protocol (FMP) developed by EMC Corporation of Hopkinton, Mass. Various aspects of FMP are described in Xu et al. U.S. Pat. No. 6,324,581 issued Nov. 27, 2001; Vahalia et al. U.S. Pat. No. 6,389,420 issued May 14, 2002; Jiang et al. U.S. Pat. No. 6,453,354 issued Sep. 17, 2002; and Vahalia et al. U.S. Pat. No. 6,973,455 issued Dec. 6, 2005; all of which are incorporated herein by reference. More particularly, the pNFS proposal applies some aspects of FMP to NFS, as suggested in a position paper by Stephen Fridella, Xiaoye Jiang, and David Black, entitled "Elements of a Scalable Network File System Protocol," presented at the NEPS workshop, University of Michigan Center for Information Technology Integration, Dec. 4, 2003.

As suggested by Fridella et al., a successful scalable network file system protocol should extend existing, proven network file system protocols, provide clients with a meta-data management interface for each file, and allow for an extensible notion of a block address space (or logical volume). The meta-data management interface should include an operation to query a file's block mapping in order to allow a client to read data directly from the storage fabric, an operation to allocate new blocks and (provisionally) add them to the file's block mapping in order to allow a client to write data directly to the storage fabric, an operation to commit or release the provisionally allocated blocks, mechanisms to maintain the consistency of file data when multiple clients are sharing access to a single file, and a mechanism (such as a lease mechanism) that enables consistent recovery from client or server failure. In accordance with the FMP protocol, the client sends requests to a metadata server. These requests include a "get_mapping" request, an "allocate_block" request, and a "commit_block" request. In addition, a client may send an initial "volume-discovery" request in order to discover shared storage objects or files for a specified namespace or file system.

The following is an example of using the FMP requests for reading data. In a compute node, a local application sends a file read request to a FMP client. The FMP client in the compute node sends a "get_mapping" request to a metadata server. The metadata server reads the file mapping, and returns a reply to the FMP client. The FMP client uses the file mapping to read file data from storage, and then the FMP client returns the file data to the local application. For subsequent reads, the FMP client may use cached data or cached mappings.

The following is an example of using the FMP requests for writing data. In a compute node, a local application sends a file write request to the FMP client. The FMP client in the compute node sends an "alloc_block" request to the metadata server. The metadata server pre-allocates storage blocks, and returns a reply to the FMP client. The FMP client returns a reply to the local application, and writes the cached file data to the pre-allocated blocks in storage. Then the FMP client sends a "commit_block" request to the metadata server. The metadata server responds by adding the blocks to the file mapping. For subsequent writes, the FMP client may use cached pre-allocated blocks.

SUMMARY OF THE INVENTION

In order for pNFS to work well, there is a need for a large number of pNFS clients to use the iSCSI storage protocol for access to a storage array via multiple paths. pNFS, however, is most efficient if the clients can access in parallel the same block devices without sharing the data paths with I/Os to the metadata server. Thus, the present invention provides methods to facilitate access of a large number of pNFS clients to block devices such as LUNs in parallel without sharing the data paths with I/Os to the metadata server. The present invention also provides ways of exporting block storage to a large number of pNFS clients and ensuring load balancing of the storage access as well as metadata access.

A data processing system includes a plurality of pNFS clients coupled to a metadata server and a storage area network (SAN) including data storage devices. In addition, the data processing system includes a cluster of iSCSI storage access servers providing a bridge between the SAN and a Gigabit Ethernet IP network of the pNFS clients. A separate IP network, for example a Fast Ethernet network, couples the pNFS clients to the metadata server so that the data paths of the iSCSI I/Os to the storage access servers are not shared with the data paths of the I/Os to the metadata server. The iSCSI storage access servers provide SCSI terminations for iSCSI initiators of the pNFS clients. The iSCSI storage access servers establish and maintain logical connections (iSCSI login sessions) over the Gigabit Ethernet IP network between the pNFS clients and LUNs. The iSCSI storage access servers use trunking so that each logical connection over the Gigabit Ethernet IP network may convey data streamed simultaneously from more than one physical network interface (e.g., a GbE i/f) of a pNFS client to each iSCSI storage access server. An iSCSI storage access server can decide to trunk a variable number of physical network interfaces (GbE I/fs) of a pNFS client depending on the demand in order to deliver a quality of service (QoS) or load balancing. The iSCSI storage access servers provide failover of a logical connection of a pNFS client from a failed iSCSI storage access server to a replacement iSCSI storage access server.

By using one IP network between the pNFS clients and the servers for metadata access and another IP network between the pNFS clients and the servers for iSCSI storage access, the network architecture permits virtually seamless as well as almost infinite scalability by adding at any time additional servers when there is a need for more throughput to the clients to ensure a desired QoS. One can start with a system including multiple pNFS clients, a SAN, and a single server bridging the clients to the SAN. Initially, the single server is programmed to serve both FMP access to metadata and iSCSI access to LUNs. As FMP clients are added to the system, additional servers are added as required to ensure the desired QoS. When a server is added, new logical connections are directed to the additional server, and more physical network interfaces of the servers can be added to the trunking to use the freed-up loading upon the servers until the number of pNFS clients begins to reach a level at which the servers are more heavily loaded. Depending on the client applications, expansion may be required when server throughput becomes a bottleneck or when the number of logical connections per server becomes a bottleneck. In either case, depending on the mix of client applications, an additional iSCSI storage access server can be provided for servicing a certain number of additional clients, and an additional metadata server can be added each time a certain number of iSCSI storage access servers are added.

An additional iSCSI storage access server may also function as a metadata server. For example, an iSCSI LUN and metadata for the iSCSI LUN are contained in a Unix-based (UxFS) file system. This file system is mounted as read-write on one of the servers that will serve metadata for access to the LUN. A small file system containing the metadata is mounted as read-only on any number of the servers that will provide iSCSI I/O access to the LUN. This metadata file system can also be striped across multiple LUNS so that a pNFS client may use concurrently multiple iSCSI storage access servers for parallel access to the LUNs. The read-only mounting of this meta file system on selected ISCSI storage access servers provides access control to the metadata and also enables control of the iSCSI I/O access via LUN masking. In other words, upon inquiry or attempted I/O access to an iSCSI storage access server about a LUN associated with the meta file system, an iSCSI initiator of a pNFS client will not discover nor will the iSCSI storage access server permit to access of the iSCSI initiator to the LUN unless the client has been authorized by the metadata. The metadata server for the file system can use this LUN masking mechanism not only at configuration time but also dynamically to change access privileges and enforce load balancing among the pNFS clients and iSCSI storage access servers.

An iSCSI storage access server may also serve metadata using FMP or pNFS in parallel with serving iSCSI. The iSCSI storage access server may also serve I/Os via the NFS protocol if the client computer is not using a pNFS client. This can be done based on need. For example, when a processing unit of an iSCSI storage access server is saturated while the GbE iSCSI pipes are still not fully loaded and less than half of a maximum number of clients (e.g., 200 max) are connected to the server, a new iSCSI storage access server can be added to serve metadata using a similar methodology as when adding more server GbE i/fs for throughput or more iSCSI servers for connectivity to the SAN.

When a new iSCSI storage access server is added to the system, the system can be dynamically re-configured. The FMP clients have the ability to reconnect the iSCSI to a new IP address and a new iSCSI storage access server each time that they access a new file as part of the list of volumes that the file accesses. Each LUN can have an associated IP address of where to access the LUN. The metadata server for the file system of the LUN or LUNS of a file can decide which of the iSCSI servers and GbE i/fs should server the client and command the iSCSI storage access servers to grant or deny access permissions to requesting clients. This load balancing can be done per file system mount at the highest level or down to the file system access or down to access of individual LUNs at the lowest level. The FMP or pNFS client has the intelligence to switch the iSCSI Discovery Address based on the list of IP addresses included in the list of volumes accessed at the file open or file system access time. This load balancing is further extended by redirecting the access of a client to iSCSI LUNs to multiple iSCSI storage access servers and by that increasing the throughput to a single file or file system by access of each LUN via a different iSCSI server. For example, a file system striped across four LUNs can be access by multiple pNFS or FMP clients via four iSCSI storage access servers, each of which access a respective one of the four LUNs.

In accordance with one aspect, the invention provides method of operation of a data processing system. The data processing system has multiple compute nodes, at least one metadata server, a plurality of iSCSI storage access server, a Gigabit Ethernet IP network, multiple data storage devices, and a storage area network. The metadata server is linked to the compute nodes for servicing requests from the compute nodes for file mapping information identifying iSCSI LUNs of data storage and logical blocks of file data within the iSCSI LUNs. The Gigabit Ethernet IP network links the iSCSI storage access servers to the compute nodes for servicing iSCSI I/O requests for access to the logical blocks of file data. The storage area network links the iSCSI storage access servers to the multiple data storage devices for servicing requests from the compute nodes for parallel access to specified iSCSI LUNs of the file data in the data storage devices. The method includes the iSCSI storage access servers reporting to the metadata server loading of the iSCSI I/O requests from the compute nodes upon the iSCSI storage access servers. The method further includes the metadata server balancing the loading of the iSCSI I/O requests from the compute nodes upon the iSCSI storage access servers by indicating to the compute nodes respective ones of the iSCSI storage access servers that should be used for access to the iSCSI LUNs.

In accordance with another aspect, the invention provides a data processing system. The data processing system includes multiple compute nodes, at least one metadata server, a plurality of iSCSI storage access servers, at least one Gigabit Ethernet IP network, multiple data storage devices for storing file data, and a storage area network. The metadata server is linked to the compute nodes for servicing requests from the compute nodes for file mapping information identifying iSCSI LUNs of data storage and logical blocks of file data within the iSCSI LUNs. The iSCSI storage access servers are coupled to the compute nodes for servicing iSCSI I/O requests from the compute nodes for access to the logical blocks of file data, and coupled to the metadata server for reporting iSCSI storage access server loading information to the metadata server. The Gigabit Ethernet IP network links the compute nodes to the iSCSI storage access servers for transferring read and write data between the compute nodes and the iSCSI storage access servers. The storage area network links the iSCSI storage access servers to the multiple data storage devices for servicing requests from the compute nodes for parallel access to iSCSI LUNs of the file data in the data storage devices. The iSCSI storage access servers are programmed for reporting to the metadata server loading of the iSCSI I/O requests from the compute nodes upon the iSCSI storage access servers. The metadata server is programmed for balancing of loading of the iSCSI I/O requests from the compute nodes upon the iSCSI storage access servers by indicating to the compute nodes respective ones of the iSCSI storage access servers that should be used for access to the iSCSI LUNs.

In accordance with yet another aspect, the invention provides a data processing system. The data processing system includes multiple compute nodes, at least one metadata server, a plurality of iSCSI storage access servers, at least one Internet Protocol (IP) network, at least one Gigabit Ethernet network, and multiple data storage devices for storing file data. Each of the compute nodes is programmed for executing a respective internal application program and programmed with a file mapping protocol (FMP) client for responding to requests from the internal application program for access to files. The Internet Protocol (IP) network links the metadata server to the compute nodes for servicing requests from the file mapping protocol (FMP) clients for file mapping information identifying iSCSI LUNs of data storage and logical blocks of file data within the iSCSI LUNs. The Gigabit Ethernet network couples the iSCSI storage access servers to the compute nodes for servicing iSCSI I/O requests from the file mapping protocol (FMP) clients for access to the logical blocks of file data. The iSCSI storage access servers are coupled via the Internet Protocol (IP) network to the metadata server for reporting iSCSI storage access server loading information to the metadata server. The storage area network links the iSCSI storage access servers to the multiple data storage devices for servicing requests from the compute nodes for parallel access to iSCSI LUNs of the file data in the data storage devices. The iSCSI storage access servers are programmed for reporting to the metadata server loading of the iSCSI I/O requests from the compute nodes upon the iSCSI storage access servers. The metadata server is programmed for balancing of loading of the iSCSI I/O requests from the file mapping protocol (FMP) clients upon the iSCSI storage access servers by indicating to the file mapping protocol (FMP) clients respective iSCSI storage access servers that should be used for access to the iSCSI LUNs.

BRIEF DESCRIPTION OF THE DRAWINGS

Additional features and advantages of the invention will be described below with reference to the drawings, in which:

FIG. 4 shows a specific format for mapping information maintained in a metadata server in the data processing system of FIG. 1;

Figure 1:
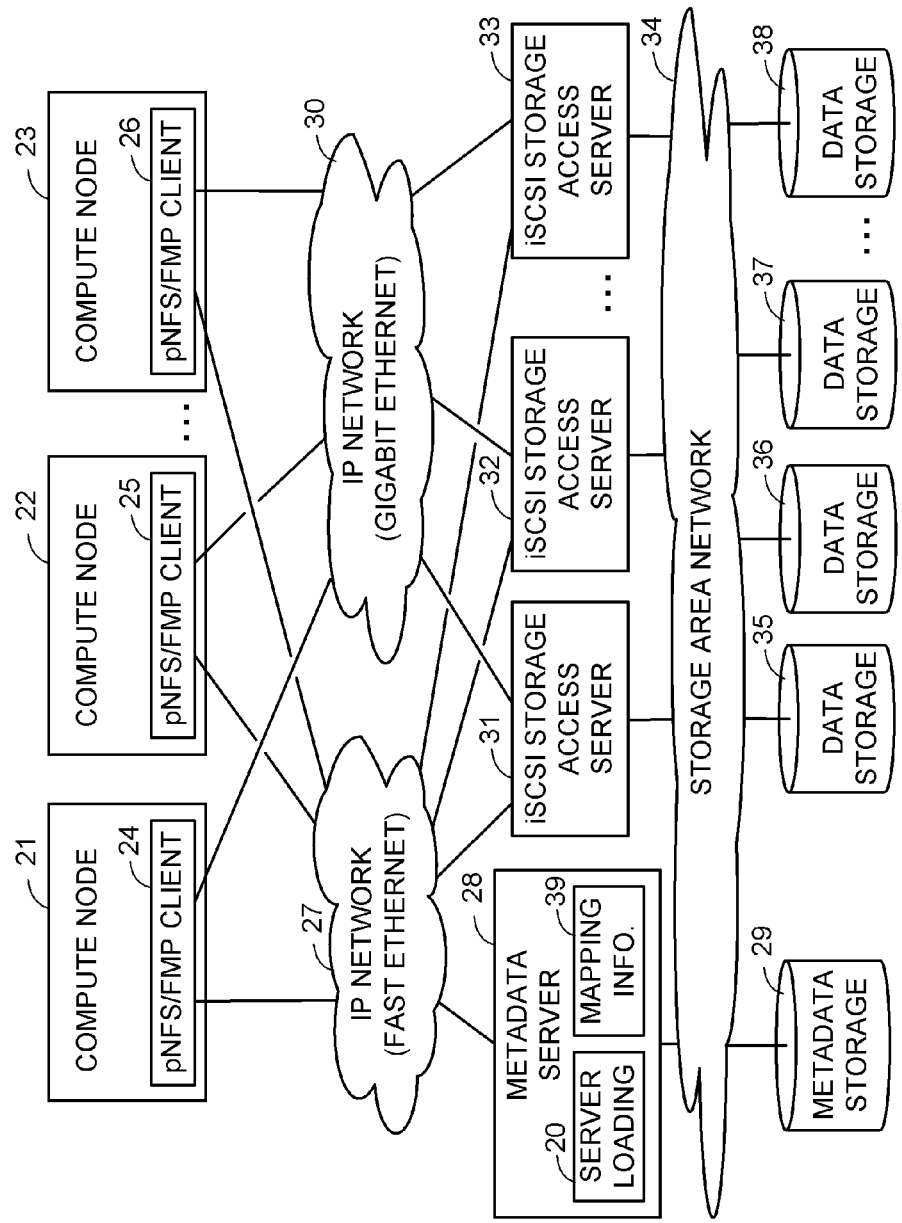
FIG. 1 is block diagram of a data processing system using a Gigabit Ethernet bridge parallel access storage architecture for high speed computing.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system using a Gigabit Ethernet bridge parallel access storage architecture for high speed computing. The data processing system includes multiple compute nodes 21, 22, ..., 23. Each compute node, for example, is a multi-processor computer fabricated on a circuit blade. For example, the circuit blade includes at least two processors and at least two integrated 1-Gigabit Ethernet channels, such as a Server Compute Blade part No. SBX82 from Intel Corporation, Santa Clara, Calif. Each compute node 21, 22, 23 is programmed to access storage using the pNFS protocol. In particular, each compute node is programmed with a respective pNFS/FMP client 24, 25, 26 for accessing metadata of a file system including a file or LUN to be accessed, and then using the metadata for accessing data of the file or LUN using the iSCSI protocol.

A fast Ethernet IP network 27 links the FMP clients to a metadata server 28 for allocating logical storage volumes and accessing metadata storage 29 on a storage area network (SAN) 34. A Gigabit Ethernet (GbE) IP network 30 links the FMP clients to a cluster of iSCSI storage access servers 31, 32, 33. providing iSCSI access to data storage 35, 35, 37, 39 of the SAN 34. The metadata server 28, the pNFS/FMP clients 24, 25, 26, and the iSCSI storage access servers 31, 32, 33 are also programmed to provide additional capabilities for storage and server allocation, load balancing, storage access request bunching, throttling, and fail-over, as further described below.

The storage system in FIG. 1 is asymmetric in that the metadata server 28 is specialized to service metadata requests but not data requests, and the iSCSI storage access servers 31, 32, 33 are specialized to service data requests but not metadata requests. An asymmetric design is efficient because a small fraction of the workload is handled by the metadata server 28. For example, the iSCSI storage access servers typically handle about 90% of the workload from the compute nodes, and the metadata server handles the remaining 10% of the workload. The asymmetric design also permits a single pNFS/FMP client to access multiple storage arrays in parallel. Thus, a single pNFS/FMP client may stripe a file across multiple logical volumes, and read or write to each of these logical volumes concurrently by sending read or write requests to a respective iSCSI storage access server for accessing each of these logical volumes.

The metadata server 28 not only maintains mapping information 39 but also maintains server loading information 20 in order to indicate to the compute nodes which of the iSCSI storage access servers 31, 32, 33 have available capacity. Each of the iSCSI storage access servers 31, 32, 33 may service any of the compute nodes for access to any of the data storage devices 35, 36, 37, 38 in the storage area network 34 provided that the iSCSI storage access server has available capacity and provided that the metadata server 28 has authorized the iSCSI storage access server to grant access of the compute node to the particular LUNs of storage to be accessed.

Preferably all of the network links in FIG. 1 are dual-redundant links, and each of the servers 28, 31, 32, 33 has a dual redundant architecture so that the system can continue processing without interruption if there is a single failure of any network link, network port, or processor. The data processing system of FIG. 1 is scalable by linking additional compute nodes to the Fast Ethernet IP network 27 and the Gigabit Ethernet IP network 30, by linking additional metadata servers between the fast Ethernet IP network 27 and the storage area network 34, by linking additional iSCSI storage access servers between the Gigabit Ethernet IP network and the storage area network, and by linking additional data storage devices to the storage area network. The storage area network may include storage devices having different capacities and different access speeds, and may employ hierarchical storage management for keeping frequently accessed data in high speed storage devices and less frequently accessed data in more economical slower speed storage devices. The disk drives may use different data interface technologies, such as fibre-channel (FC), AT attachment (ATA), or serial ATA (SATA).

Figure 2:
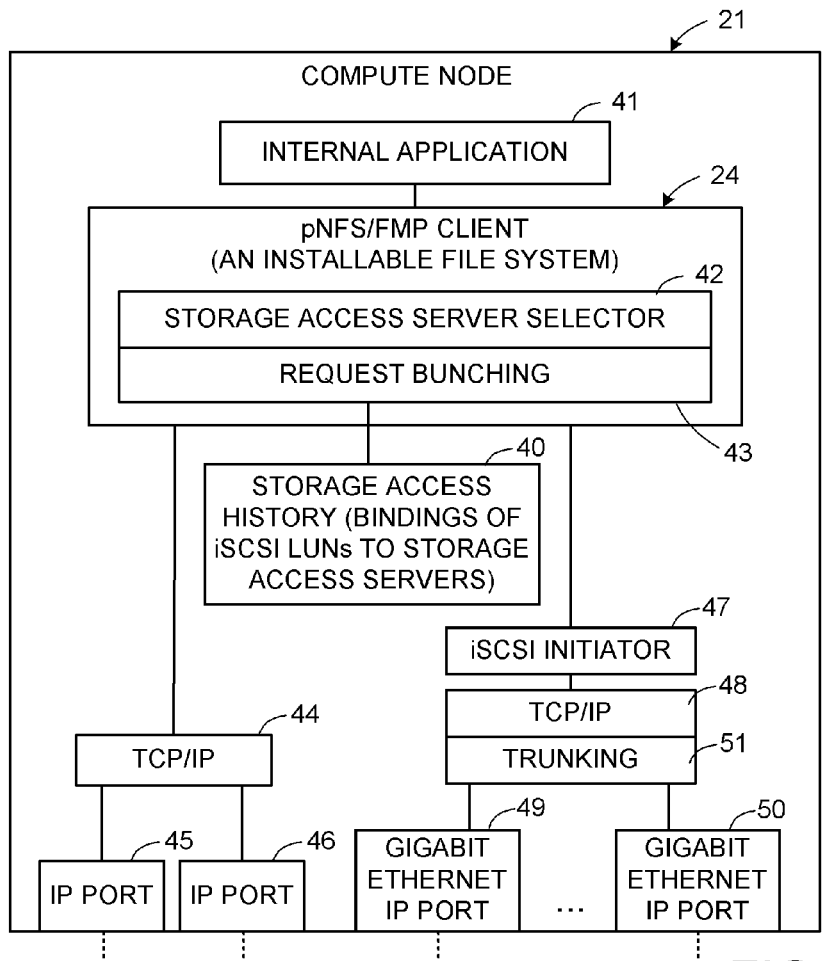
FIG. 2 is a block diagram of one of the compute nodes in the data processing system of FIG. 1.

FIG. 2 is a block diagram of one of the compute nodes in the data processing system of FIG. 1. The compute node 21 is programmed with an internal application 41 that calls the pNFS/FMP client 24 for access to storage. The pNFS/FMP client 24 is an installable file system. The pNFS/FMP client 24 includes a storage access server selector 42 and a request bunching module 43. The storage access server selector 42 accesses a storage access server access history 40 including bindings of iSCSI LUNs to storage access servers, as indicated by the metadata server when allocating the iSCSI LUNs to the pNFS/FMP client 24. Metadata requests are packetized by a TCP/IP process 44 and transmitted by one of two IP ports 45 and 46 to the metadata server. Data requests are formatted into iSCSI requests by an iSCSI initiator 47 and packetized by a TCP/IP process 48 and transmitted by at least one of a plurality of Gigabit Ethernet ports 49, 50 to an IP address of a selected one of the storage access servers.

Figure 3:
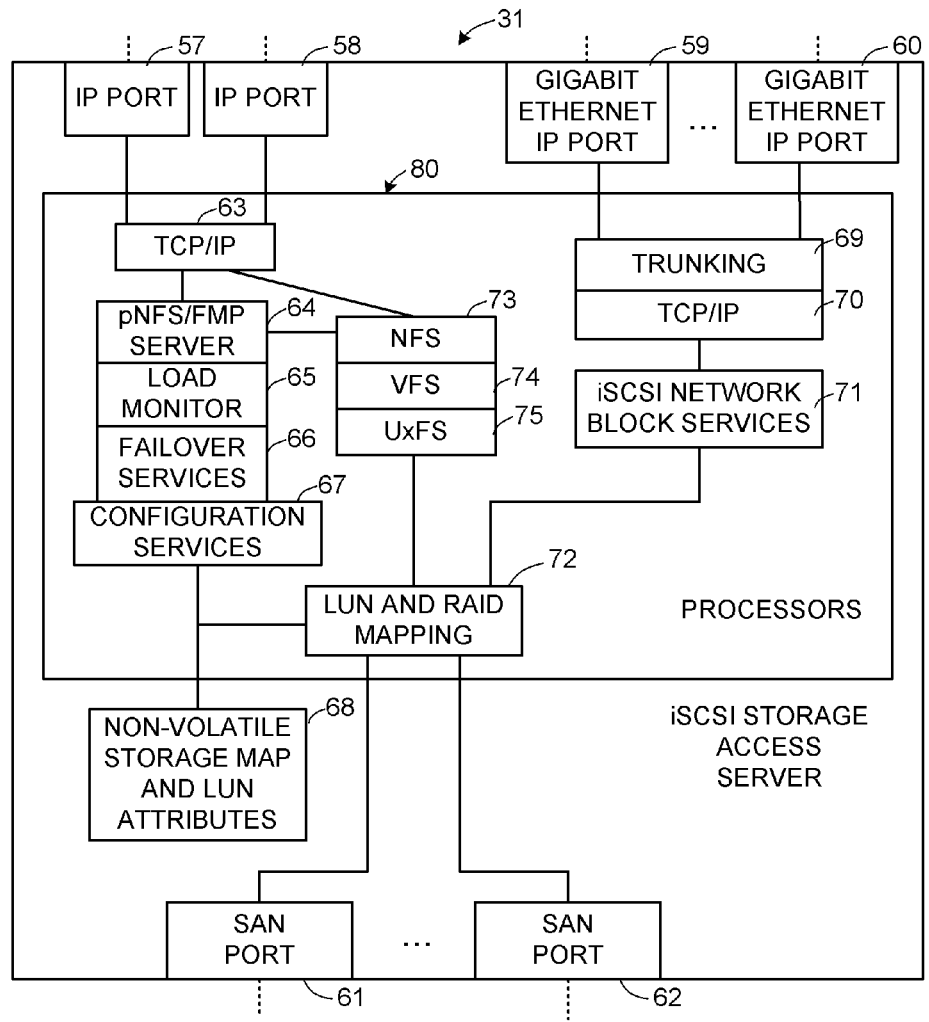
FIG. 3 is a block diagram of one of the iSCSI storage access servers in the data processing system of FIG. 1.

FIG. 3 is a block diagram of one of the iSCSI storage access servers 31 in the data processing system of FIG. 1. Each iSCSI storage access server, for example, is a multi-processor computer fabricated on a circuit blade. The iSCSI storage access server 31 has dual-redundant fast Ethernet IP ports 57, 58, a plurality of Gigabit Ethernet IP ports 59, 60, and a plurality of SAN ports 61, 62. At least one of the processors 80 of the server 31 is programmed with a TCP/IP module 63 for servicing the IP ports 57, 58 and directing pNFS/FMP requests to a pNFS/NFS server module 64 and NFS requests to an NFS module 73. The pNFS/FMP server module 64 has an associated load monitor module 65, a failover services module 66, and a configuration services module 67. The pNFS/FMP server module 64 also uses lower-level functions of an NFS module 73, a Virtual File System (VFS) module 74, and a Unix-based file system module (UxFS) 75. The NFS module 73 may also service NFS clients that do not use pNFS/FMP, such as NFS clients that use NFS-V4.

The load monitor 65 determines the percent utilization of the bandwidth of the Gigabit Ethernet IP ports 59, 60 and the percent utilization of the throughput of the iSCSI storage access server 80 for bridging the Gigabit Ethernet IP network to the SAN. At periodic intervals or at the request of the metadata server, the load monitor 65 reports this utilization to the metadata server so that the metadata server may perform load balancing with respect to the LUNs managed by the metadata server.

The failover services 67 permit the iSCSI storage access server 31 to take over the servicing of logical GbE connections of compute nodes from a failed iSCSI storage access server.

The configuration services 67 maintain a non-volatile copy 68 of a storage map and LUN attributes. The storage map includes LUN and RAID mapping information identifying SAN storage device addresses and specifying RAID mapping for LUNs accessible to the compute nodes through GbE iSCSI access to the iSCSI storage access server 31. For example, the logical-to-physical mapping for the LUNs can be changed to substitute a mirror or backup copy of a storage volume containing the LUNs for an original storage volume found to be inaccessible or corrupted, or to substitute a new storage volume at the end of a process of migrating the original storage volume to the new storage volume. The LUN attributes also include lists of clients that have permission to use the iSCSI storage access server 31 for access to the LUNs.

At least one of the processors 80 is programmed with a trunking module 69 and a TCP/IP module 70 for servicing the Gigabit Ethernet IP ports 59, 60. iSCSI requests from the Gigabit Ethernet IP ports 59, 60 are passed on to an iSCSI network block services module 71. iSCSI I/O requests are serviced by using the LUN and RAID mapping module 72 to map LUNs to SAN addresses and translating the iSCSI I/O requests into SAN I/O requests sent to the SAN via the SAN ports 61, 62.

FIG. 4 shows the mapping information 39 in the metadata server. This mapping information includes a table or index of allocated logical volume ID numbers corresponding to iSCSI LUNs. Each logical volume is associated with a particular compute node or server that requested the logical volume to be allocated. This compute node or server is primary with respect to management of metadata of the logical volume and file systems contained within or striped across the logical volume. Other compute nodes may access the logical volume or the file systems contained within or striped across the logical volume, but the other compute nodes must have permission from the primary compute node or server for accessing the logical volume. The metadata server, for example, can be primary with respect to files shared among the compute nodes. The logical volume is also associated with an IP address of one of the storage access servers indicated as the storage access server that should be used for accessing the logical volume. Each logical volume also has attributes such as a size in bytes, a creation time, and client access groups for LUN masking. Each logical volume also has a logical-to-physical mapping that specifies a physical block address on the storage area network for each logical block address in the logical volume.

Figure 5:
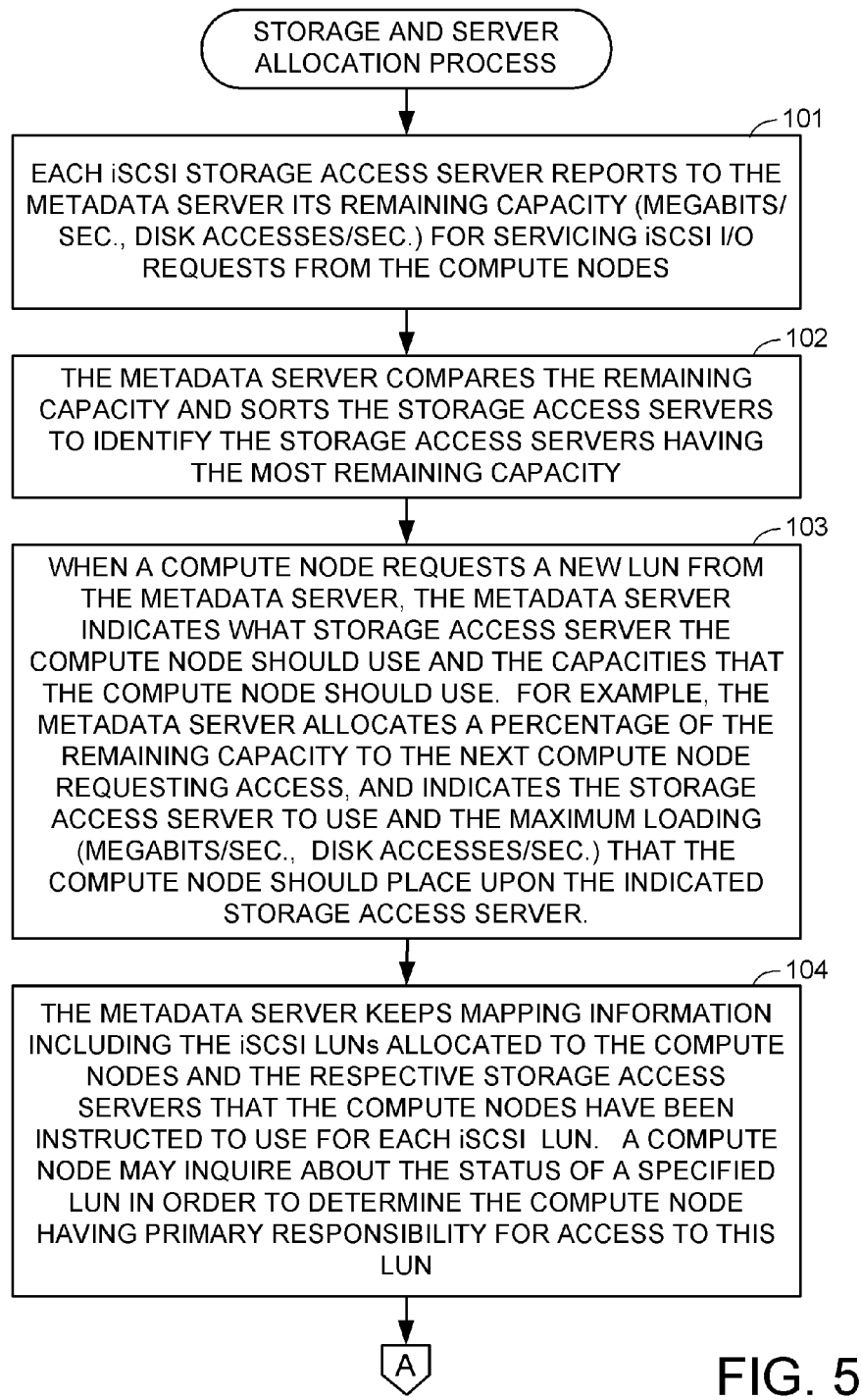
FIGS. 5 and 6 comprise a flowchart of a storage and server allocation process in the data processing system of FIG. 1.
Figure 6:
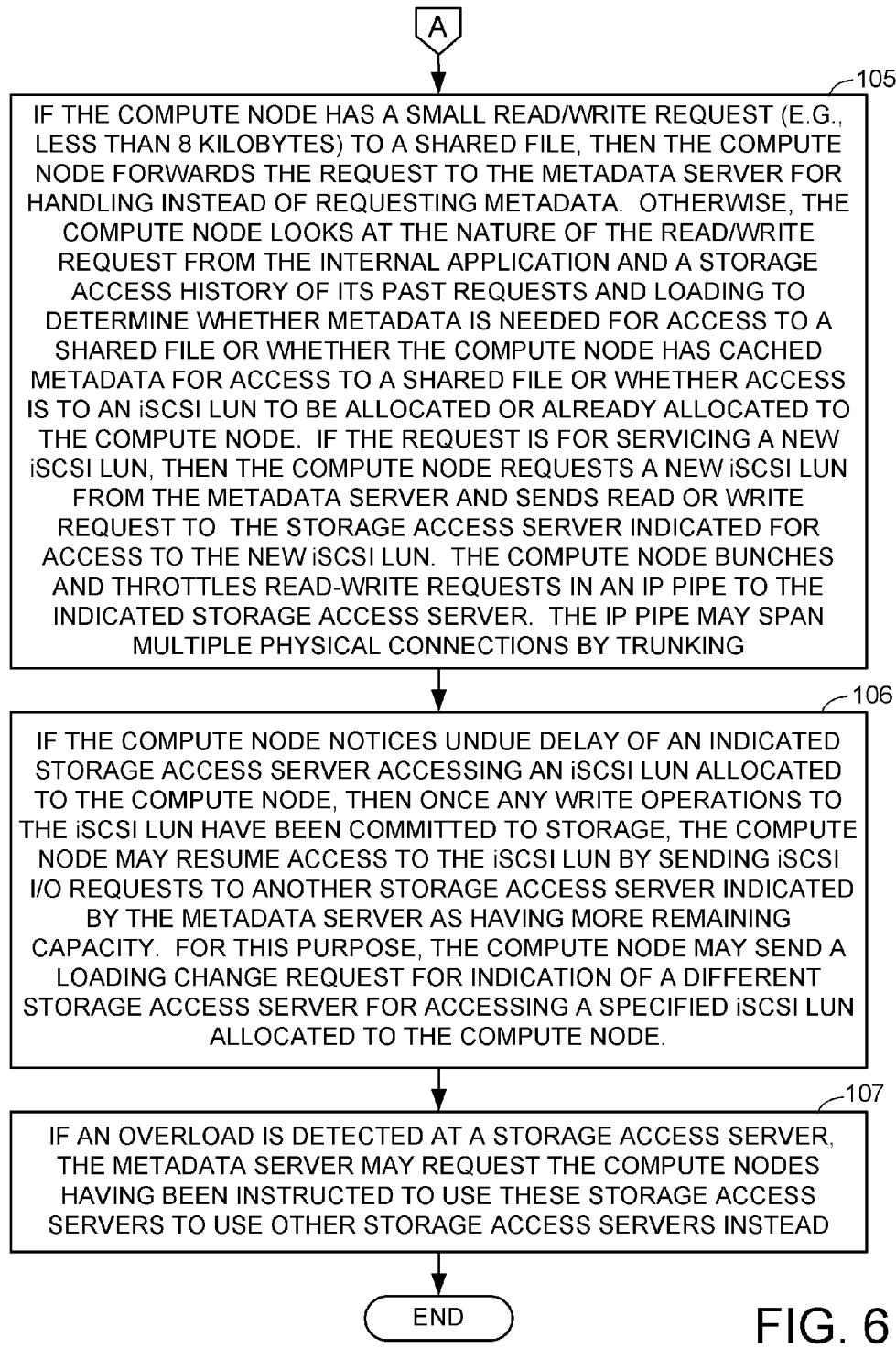

FIGS. 5 and 6 show a flowchart of a storage and server allocation process in the data processing system of FIG. 1. In a first step 101 of FIG. 5, each iSCSI storage access server reports to the metadata server its remaining capacity for servicing iSCSI I/O requests from the compute nodes. The remaining capacity includes an available data rate in megabits per second over the Gigabit Ethernet pipes into the GbE ports of the storage access server, and an available disk I/O access rate in accesses per second out of the SAN ports of the storage access server.

In step 102, the metadata server compares the remaining capacity and sorts the storage access servers to identify the storage access servers having the most remaining capacity. For example, the metadata server maintains a list of the storage access servers ordered by the most available Gigabit Ethernet bandwidth, and a list of the storage access servers ordered by the most available disk access rate. From theses lists, the metadata server determines the storage access server that would be most suitable for allocation of a new iSCSI LUN of disk storage, or for a particular purpose such as write mostly or read by many.

In step 103, when a compute node requests allocation of a new iSCSI LUN, the metatdata server indicates what storage access server the compute node should use and the capacities that the compute node should use. For example, the metadata server allocates a percentage of the remaining capacity to the next compute node requesting access, and indicates the storage access server to use and the maximum loading in megabits per second, or disk accesses per second, that the compute node should place upon the indicated storage access server.

In step 104, the metadata server keeps mapping information including the iSCSI LUNs allocated to the compute nodes and the respective storage access servers that the compute nodes have been instructed to use for accessing each iSCSI LUN. A compute node may send a request to the metadata server to inquire about the status of a specified LUN in order to determine the compute node having primary responsibility for access to this LUN.

In step 105 of FIG. 6, if the compute node has a small read or write request to a shared file (e.g., less than 8 kilobytes to be read or written), then the compute node forwards the request to the metadata server for handling instead of requesting metadata. Otherwise, the compute node looks at the nature of the read or write request from the internal application and a storage access history of its past requests and loading to determine whether the present request requires metadata from the metadata server or whether the present request can be serviced by access to an iSCSI LUN allocated to the compute node. If the request is for access to a shared file and the compute node does not have access rights or mapping information for access to the shared file, then the FMP client of the compute node sends a metadata request to the metadata server for access rights and mapping information, and once the FMP client receives mapping information from the metadata server and an indication of the storage access server that should be used for read or write access to the shared file and loading limitations, the FMP client uses the mapping information to formulae read or write requests transmitted to the indicated storage access server at a rate consistent with the loading limitations. If the request is for access to a shared file and the compute node already has access rights and mapping information for access to the shared file in its cache of storage access history, then the FMP client uses the cached mapping information to formulate a read or write request transmitted to the indicated storage access server at a rate consistent with the loading limitations. The compute node bunches the read-write requests in an IP pipe to the indicated storage access server.

In step 106, if the compute node notices undue delay of an indicated storage access server accessing an iSCSI LUN allocated to the compute node, then once any pending write operations to the iSCSI LUN have been committed to storage, the compute node may resume access to the iSCSI LUN by sending read or write requests to another storage access server indicated by the metadata server as having more present availability. For this purpose, the compute node may send a loading change request to the metadata server for the indication of a different storage access server for accessing a specified iSCSI LUN allocated to the compute node.

In step 107, if an overload is detected at a storage access server, the metadata server may request the compute nodes having been instructed to use this storage access server to use other storage access servers instead.

The metadata server (28 in FIG. 1) functions as a pNFS/FMP server to provide a number of services to the pNFS/FMP clients (24, 25, 26) and the iSCSI storage access servers (31, 32, 33). These services include pNFS/FMP client authentication, file and directory access management, coherency of file metadata cached locally by the pNFS/FMP clients in their respective compute nodes (21, 22, 23), and scalability by separation of metadata management from file data access.

The metadata server identifies and authenticates the pNFS/FMP clients for access to the iSCSI storage access servers. When a pNFS/FMP client on a compute node wants to access a file system it owns, the metadata server assures its identity and provides authorization. The security level that should be used (AUTH_NONE, AUTH_UNIX, AUTH_DES, AUTH_KERB, etc.) is determined by the capabilities of the metadata server.

The metadata server provides the pNFS/FMP clients with the file structure of the files on a file system to be accessed. When the pNFS/FMP client requests metadata in order to perform an operation on a particular file, the metadata server examines the permissions and access controls associated with the file and sends the pNFS/FMP client a map of the entire file to be cached locally by the pNFS/FMP client on its respective compute node. The file map consists of the list of volumes ID, offsets, and block count (a set of adjacent disk blocks or extents) in a run-length form. The client can go to the iSCSI storage access server directly and access the logical blocks as given in the file map.

The pNFS/FMP clients will normally request the relevant file block map, cache the map in its page buffer cache (common to NFS) and then read the data blocks via iSCSI and cache them locally in a data cache of the respective compute node. The metadata server maintains a communication channel with the pNFS/FMP client. This pNFS/FMP connection is validated by successful heartbeats between the metadata server and the pNFS/FMP client. When the heartbeat fails the client stops any I/O activity and invalidates all of the cached file maps and data blocks. The metadata server manages the access to the file by granting read or write permissions to the pNFS/FMP clients. Locks govern access permission to each file system block. Each block may be either not locked, locked for write by a single pNFS/FMP client, or locked for read by one or multiple clients. The metadata server allows multiple writers, so if a block is modified by another client, the pNFS/FMP server notifies all the clients that have the file open, using an FMP Notify protocol. pNFS/FMP clients that access the same block range are notified to invalidate their local cache and go back to the metadata server to refresh its locally cached copy of that file map, and go to the iSCSI storage access servers and read the data blocks.

The metadata server ensures scalability by performing the metadata management tasks of directory access management and file system block allocation separate from file data access. All the data traffic flows directly between the pNFS/FMP clients and the iSCSI storage access servers. Metadata access for some files can occur concurrently with data access of other files, and data access for a file may occur concurrently over multiple iSCSI storage access servers. Metadata access at one metadata server can support rather continuous and unimpeded data access at up to about nine iSCSI storage access servers. As a result the number of pNFS/FMP clients that can be served by the metadata server is an order of magnitude higher that the number of NFS clients that could be served by the same server.

Figure 7:
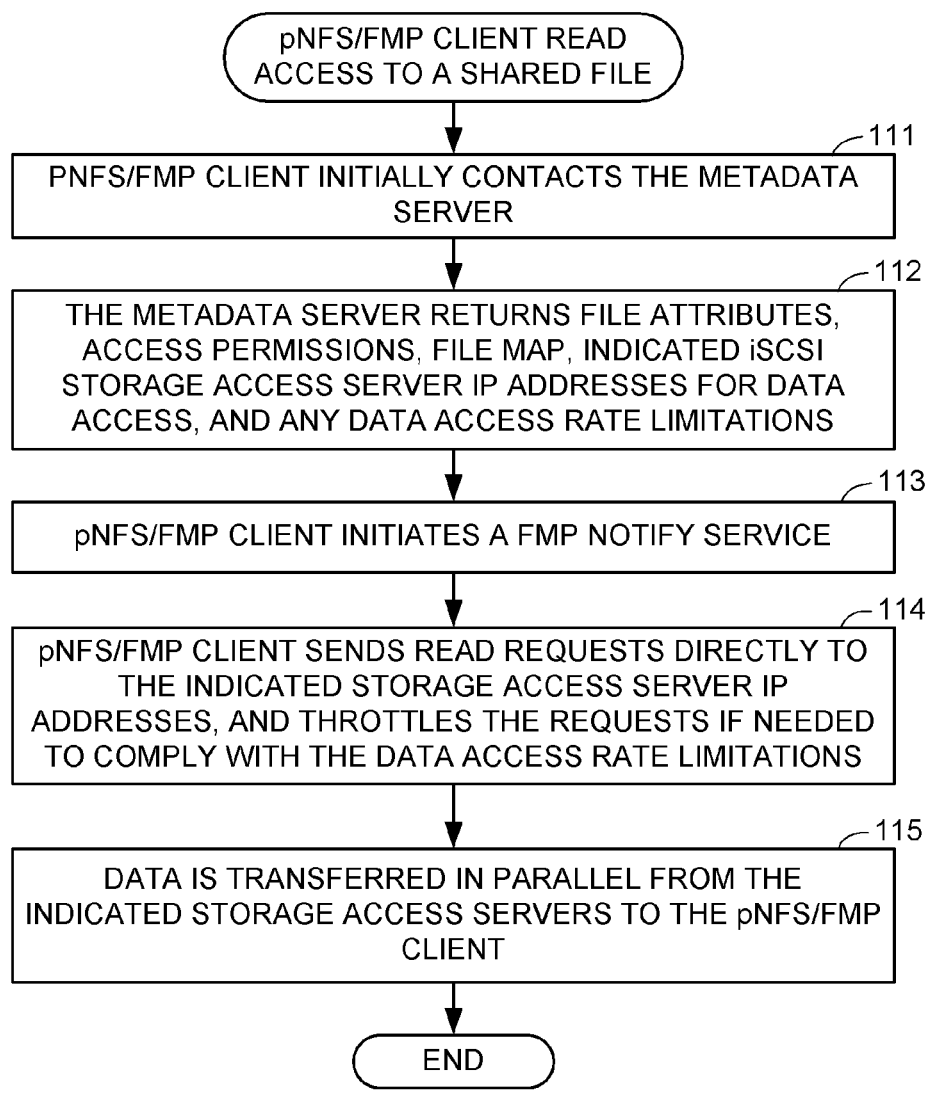
FIG. 7 is a flowchart of read access by an FMP client of a compute node to a shared file managed by the metadata server.

FIG. 7 shows a flowchart of read access by an pNFS/FMP client to a file managed by the metadata server. In step 111, the pNFS/FMP client contacts the metadata server. Initially the pNFS/FMP client software is installed on the compute node, the pNFS/FMP client mounts the shared file system and establishes a FMP session with the metadata server. The FMP session is a "two way channel" between the pNFS/FMP client and the metadata server. The metadata server assigns a unique id to each FMP session, and validates and authenticates the identity of the pNFS/FMP client via Kerberos or a similar authentication protocol. At mount time the pNFS/FMP client receives a list of disk volumes where the installable file system is located. The pNFS/FMP client checks the signature on the volumes to match to the iSCSI storage access server that it connects to. The pNFS/FMP client now understands the topology of the file system and data storage network and is able to contact the metadata server in order to request access to a file.

In step 112, the metadata server returns file attributes, access permissions, a file map, indicated iSCSI storage access servers for data access to the file, and any data access rate limitations. Having received a request for access to a file within a directory in the file system it manages, the metadata server consults its file system structure in its local cache (initially fetched from the metadata storage), and returns to the pNFS/FMP client an FMP file handle and a list of file attributes and access permissions, which authorizes the pNFS/FMP client to access the specific file and directory, with a specific set of permissions, for a specific length of time. The metadata server also sends, in the same network message, a file map consisting of a list of volume IDs, offsets and extents in run-length form (for increased metadata traffic efficiency), an indication of one or more iSCSI storage access server IP addresses for data access to the file, and any data access rate limitations. Assuming that the file is large enough, the file will span across multiple 256 KB striped disk volumes, and each volume will be accessed at a respective indicated storage access server IP address. This gives the client the opportunity to send in parallel multiple 256 KB I/O requests to multiple disk volumes.

In step 113, the pNFS/FMP client initiates an FMP Notify service. The communication between the pNFS/FMP client and the metadata server is governed by two co-operating protocols: FMP and FMP/Notify. Each protocol uses its own RPC message stream. The pNFS/FMP client, who is the service provider for the FMP/Notify protocol, inserts the FMP/Notify service end point ID into the FMP request to the metadata server. The metadata server assigns a session ID and returns it to the pNFS/FMP client. The metadata server will use the client's FMP/Notify end point ID as the destination end point for the FMP/Notify requests. This allows the metadata server to notify the pNFS/FMP client when another client is attempting to change the data in that file or portion of the file. When the pNFS/FMP client receives a notify message, it must go back to the metadata server to renew its access to the file and then update its local cache from storage. This allows all FMP clients across the system to maintain cache consistency. Because the FMP/Notify service is running on the pNFS/FMP client, the metadata server just checks for conflicts and sends notifications only in cases of lock conflicts, and not each time a client requests access to the same file. This feature improves the scalability of the metadata server.

In step 114, the pNFS/FMP client sends read requests directly to the indicated iSCSI storage access server IP addresses, and throttles the requests if needed to comply with any data access rate limitations. The pNFS/FMP client issues I/O requests to read all or some of the data of the file, whose file block map is in its cache, from the indicated storage access server IP address.

In step 115, data is transferred in parallel from the indicated storage access servers to the pNFS/FMP client. The client sends multiple read I/O requests to multiple disk volumes in parallel. The I/O requests are split to the size of the file system logical volume stripe size and sent to the striped volumes in parallel. For example, the pNFS/FMP client sends its read request to four storage access servers simultaneously. Each of the storage access servers transmits the requested I/Os in parallel, generating approximately 40 MB/s per volume or a potential peak rate of 160 MB/s for this file system configuration (if the client data pipes are wide enough and there is no indicated data access rate limitation).

Figure 8:
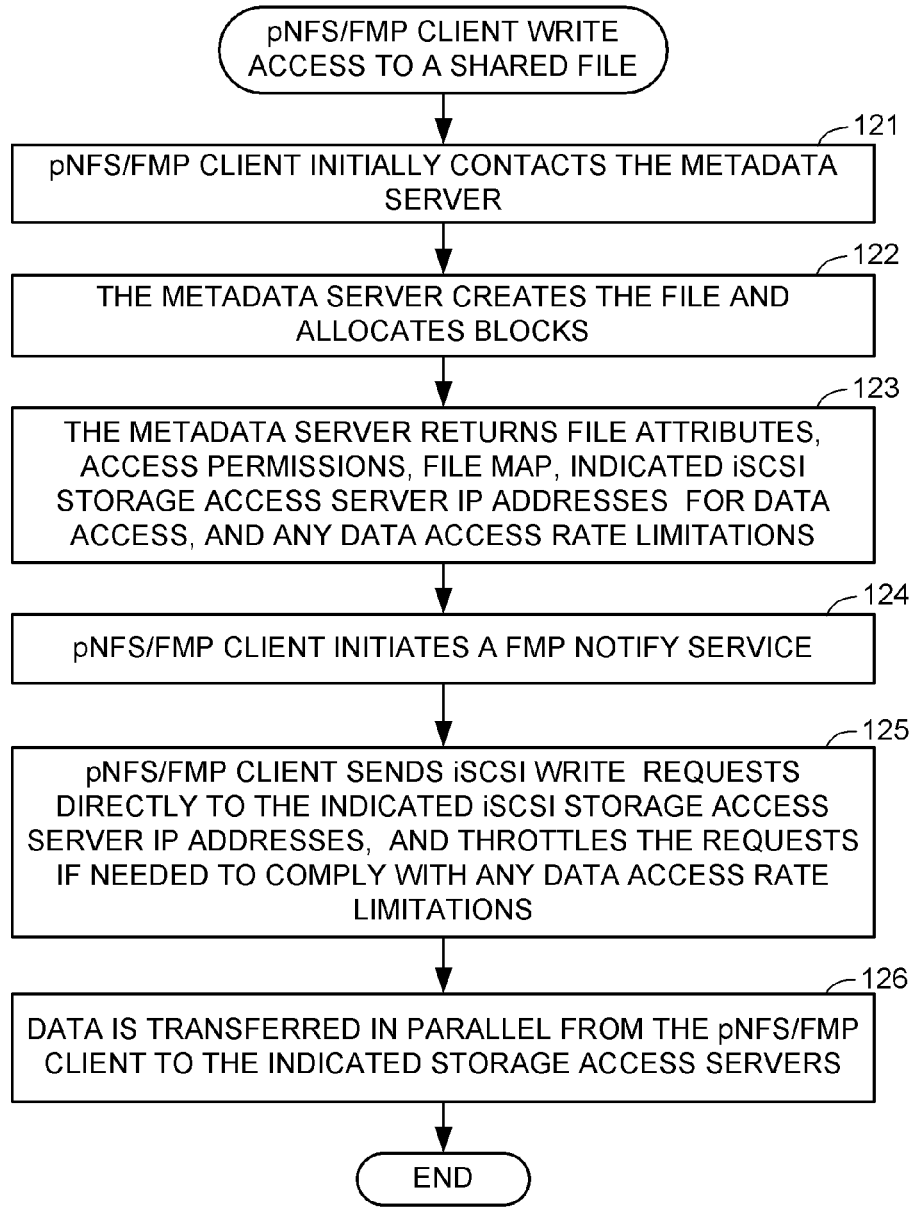
FIG. 8 is a flowchart of write access by an FMP client of a compute node to a shared file managed by the metadata server.

FIG. 8 shows a flowchart of write access by a pNFS/FMP client to a shared file managed by the metadata server. In a first step 121, the pNFS/FMP client initially contacts the metadata server. The pNFS/FMP client is authenticated, as described above for the case of a read (step 111 of FIG. 7). The pNFS/FMP client makes a request to open a new file for write. The pNFS/FMP client includes in the request a minimum number of file system blocks to be initially allocated to the file.

In step 122, the metadata server creates the file and allocates blocks. The metadata server creates a new file by allocating a new inode in the file system and setting file attributes as requested by the client. The metadata server keeps a bitmap table of all the free file system blocks and least utilized cylinder groups in the file system. The server allocates file system blocks to the file to achieve sequential disk layout for the file.

In step 123, the metadata server returns file attributes, access permissions, a file map, an indication of one or more storage access servers for data access, and any data access rate limitations. The metadata server returns to the pNFS/FMP client a FMP file handle and a list of file attributes and access permissions, which authorizes the client to access the specific file for write operations. The metadata server also sends, in the same network message, the list of blocks allocated to the file consisting in a list of volume IDs, offsets and extents in run-length form (for increased metadata traffic efficiency), one or more storage access server IP addresses for data access, and any data access rate limitations. Assuming that the file is large enough, the file will span across multiple 256 KB striped disk volumes, and each disk volume is to be accessed at an indicated storage access server IP address. This gives the pNFS/FMP client the opportunity to send in parallel multiple 256 KB I/O requests to multiple disk volumes.

In step 124, the pNFS/FMP client initiates a FMP Notify service in order to notify the pNFS/FMP client when another client is attempting to read or write to the same file. When the pNFS/FMP client receives a notify message, it must flush all the application data from its memory to the indicated iSCSI storage access servers, send a commit for these blocks to the metadata server, return to the metadata server all the file blocks that were not committed, and send a new write request to the metadata server.

In step 125, the pNFS/FMP client sends read requests directly to the indicated storage access servers, and throttles the requests if needed to comply with any data access rate limitations. The pNFS/FMP client packages I/O requests from the local application into an SCSI device buffer of the iSCSI initiator, for each of the logical volumes across which the file system is striped, up to 256K of data on each.

In step 126, data is transferred in parallel from the pNFS/FMP client to the indicated iSCSI storage access servers. The pNFS/FMP client sends an iSCSI write command to flush the device buffers to each of the four disk volumes used by the file system on disk in the storage access servers. The pNFS/FMP client may continue to write data to the storage access servers until it uses all the allocated blocks of the file that it owns. Before the list of allocated blocks is empty, the pNFS/FMP client may request additional blocks for the file from the metadata server and continue writing.

The iSCSI storage access servers may use certain NFS and UxFS capabilities for access control of the pNFS clients to the LUNs. For example, an iSCSI LUN and metadata for the iSCSI LUN are contained in a Unix-based (UxFS) file system. This file system is mounted as read-write on one of the servers that will serve metadata for access to the LUN. As shown in FIG. 8, this file system (FS1) can be striped across multiple LUNS 131, 132, 133 so that a pNFS client may use concurrently multiple iSCSI storage access servers for parallel access to the data sectors (dVOL-1, dVOL-2, ..., dVOL-3) of the LUNs of the striped file system. Contained within FS1 is a small striped meta volume file system iFS1. The small striped meta volume file system iFS1 is mounted read-only on selected iSCSI storage access servers in order to provide access control of pNFS/FMP clients to the metadata and also to enable control of the iSCSI I/O access of the selected clients to specified LUNs via LUN masking. In other words, upon inquiry or attempted I/O access to an iSCSI storage access server upon a LUN contained in the file system mounted as read-only, an iSCSI initiator of a pNFS client will not discover nor will the iSCSI storage access server permit access of the iSCSI initiator to the LUN unless the client has been authorized to access the particular LUN by the metadata of the iFS1 file system. The metadata server for the file system can use this LUN masking mechanism not only at configuration time but also dynamically to change access privileges and enforce load balancing among the pNFS clients and iSCSI storage access servers.

Figure 9:
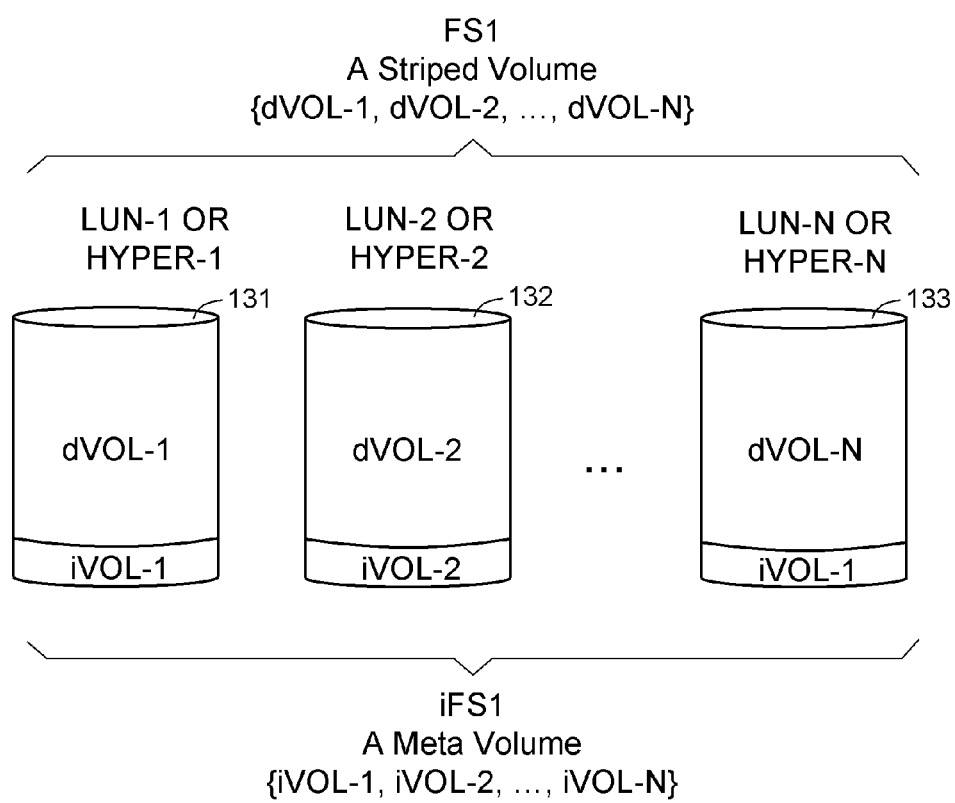
FIG. 9 is a schematic diagram showing data and metadata in a striped volume of storage for NFS export to the iSCSI storage access servers for LUN access control in the data processing system of FIG. 1.
Figure 10:
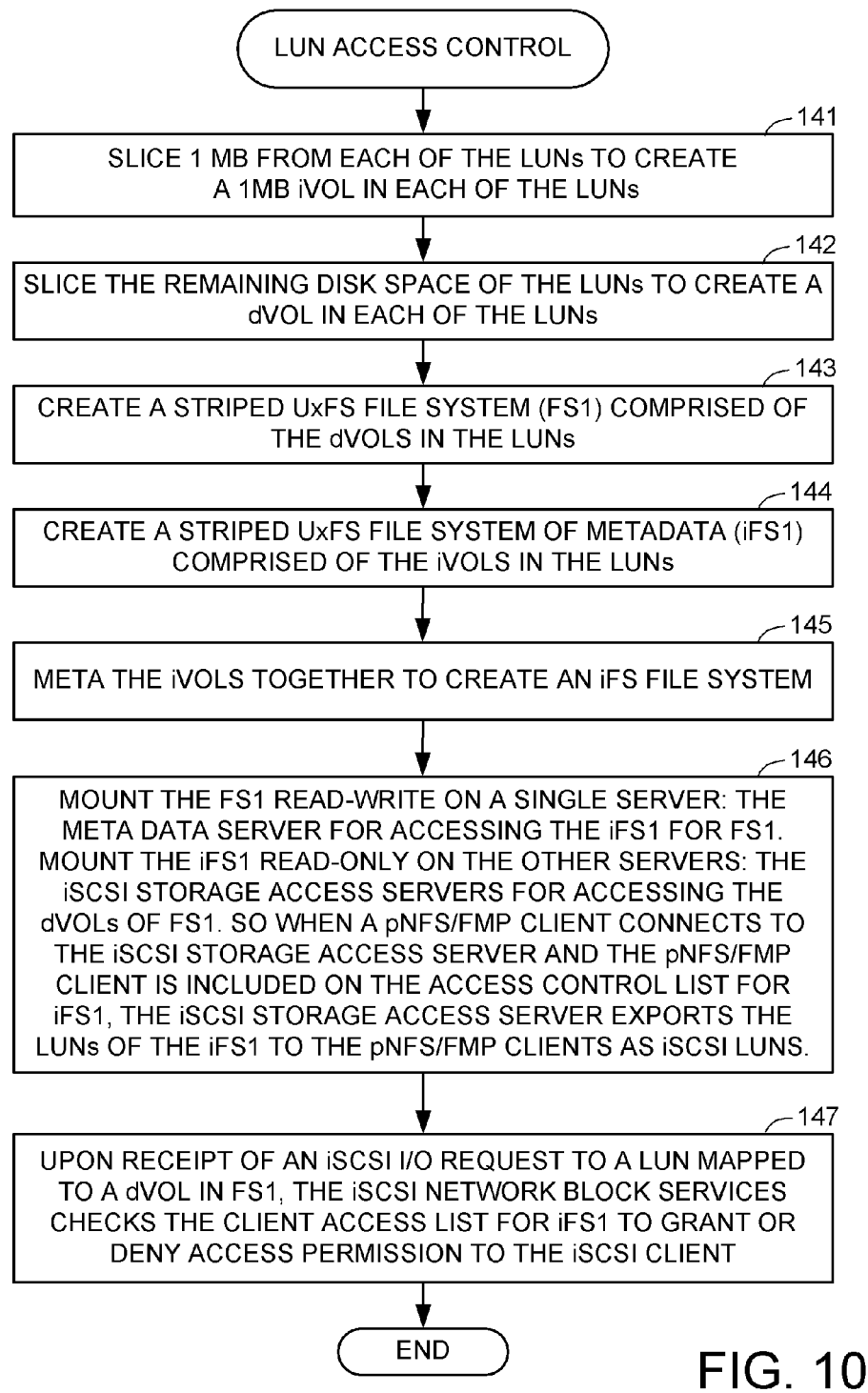
FIG. 10 is a flowchart of a method of LUN access control using the organization of data and metadata shown in FIG. 9.

FIG. 10 shows how the data processing system of FIG. 1 may use the striped file system organization of FIG. 9 for access control to the LUNs 131, 132, ..., 133 in FIG. 9. In a first step 141 of FIG. 10, 1 MB is sliced from each of the LUNs to create a 1 MB iVOL in each of the LUNs. In step 142, the remaining disk space of the LUNs is sliced to create a dVOL in each of the LUNs. In step 143, a striped UxFS file system (FS1) is created comprised of the dVOLs in the LUNs. In step 144, a striped UxFS file system of metadata (iFS1) is created comprised of the iVOLs in the LUNs. In step 145, the iVOLs are combined together to create the metadata file system iFS1. In step 146, the striped file system FS1 is mounted read-write on a single server. This single server is the server for serving metadata of the LUNs. The meta file system iFS1 is mounted as read-only on other servers, which are the iSCSI storage access servers for accessing the dVOL of FS1. So when a pNFS/FMP client connects to the iSCSI storage access server and the pNFS/FMP client is included on the access control list for iFS1, the iSCSI storage access server exports the LUNS of the iFSl to the pNFS/FMP clients as iSCSI LUNs. In step 147, upon receipt of an iSCSI request to a LUN mapped to a dVOL in FS1, the iSCSI network block services checks the client access list for iFSl to grant or deny access permission to the iSCSI client.

Figure 11:
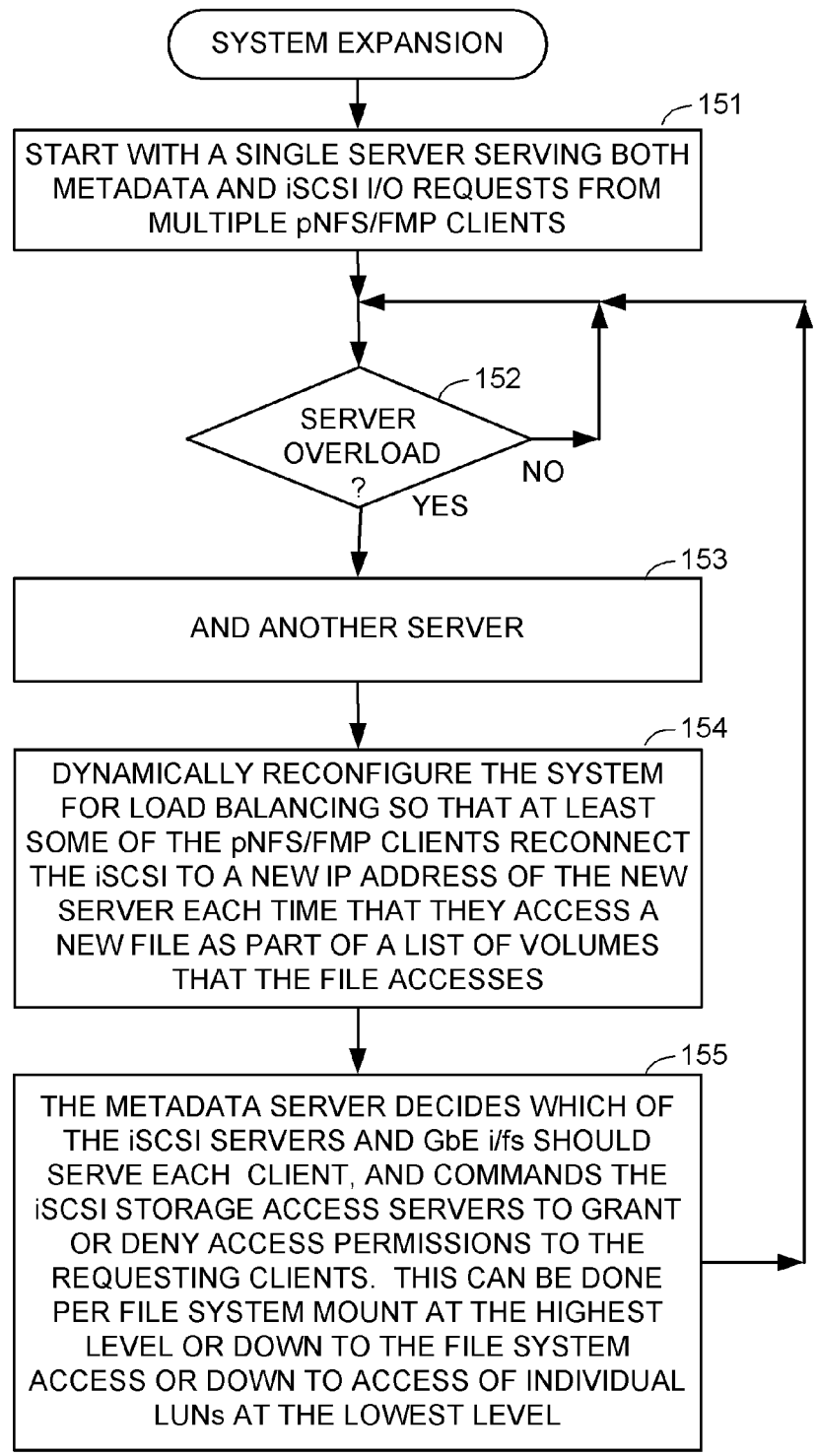
FIG. 11 is a flowchart of a method of expansion of the data processing system in FIG. 1.

By using one IP network between the pNFS clients and the servers for metadata access and another IP network between the pNFS clients and the servers for iSCSI storage access, the network architecture permits virtually seamless as well as almost infinite scalability by adding at any time additional servers when there is a need for more throughput to the clients to ensure a desired QoS. As shown in FIG. 11, in step 151, one can start with a system including multiple pNFS/FMP clients, and a single server bridging the clients to the SAN. Initially, the single server is programmed to serve both FMP access to metadata and iSCSI access to LUNs. As pNFS/FMP clients are added to the system, an overload of a desired QoS occurs (step 152), so in step 153 additional servers are added as required to ensure the desired QoS. Once a server is added, in step 154, the system is dynamically reconfigured for load balancing so that at least some of the pNFS/FMP clients reconnect the iSCSI to a new IP address of the new server each time that they access a new file as part of the list of volumes that the file accesses. Each LUN can have an associated IP address of where to access the LUN. For load balancing, as new logical connections are directed to the additional server, more physical network interfaces of the servers are added to the trunking to use the freed-up loading upon the servers until the number of pNFS clients begins to reach a level at which the servers are more heavily loaded. Depending on the client applications, expansion may be required when server throughput becomes a bottleneck or when the number of logical connections per server becomes a bottleneck. In either case, depending on the mix of client applications, an additional iSCSI storage access server can be provided for servicing a certain number of additional clients, and an additional metadata server can be added each time a certain number of iSCSI storage access servers are added.

In step 255, the metadata server for the file system of the LUN or LUNS of a file decides which of the iSCSI servers and GbE i/fs should serve each pNFS/FMP client and commands the iSCSI storage access servers to grant or deny access permissions to requesting clients. This load balancing can be done per file system mount at the highest level or down to the file system access or down to access of individual LUNs at the lowest level. The pNFS/FMP client has the intelligence to switch the iSCSI Discovery Address based on the list of IP addresses included in the list of volumes accessed at the file open or file system access time. This load balancing is further extended by redirecting the access of a client to iSCSI LUNs to multiple iSCSI storage access servers and by that increasing the throughput to a single file or file system by access of each LUN via a different iSCSI storage access server. For example, a file system striped across four LUNs can be accessed by multiple pNFS/FMP clients via four iSCSI storage access servers, each of which accesses a respective one of the four LUNs.

An additional iSCSI storage access server may also serve metadata using pNFS/FMP in parallel with serving iSCSI. The iSCSI storage access server may also serve I/Os via the NFS protocol if the compute node is not using a pNFS/FMP client. This can be done based on need. For example, when a processing unit of an iSCSI storage access server is saturated while the GbE iSCSI pipes are still not fully loaded and less than half of a maximum number of clients (e.g., 200 max) are connected to the server, a new iSCSI storage access server can be added to serve metadata using a similar methodology as when adding more server GbE i/fs for throughput or more iSCSI storage access servers for connectivity to the SAN.

In view of the above, there has been described a data processing system including compute nodes, at least one metadata server, iSCSI storage access servers, and data storage devices. The iSCSI storage access servers provide a bridge between a Gibabit Ethernet IP network of the compute nodes and storage access network of the data storage devices. The metadata server services requests from the compute nodes for file mapping information identifying iSCSI LUNs of data storage and logical blocks of file data. The storage access servers service iSCSI I/O requests from the compute nodes, and report storage access server loading to the metadata server. The data storage devices are linked to the iSCSI storage access servers for servicing parallel file access requests from the compute nodes for parallel access to specified iSCSI LUNs of the file data in the data storage devices. The metadata server is programmed for storage access server load balancing by indicating to the compute nodes respective ones of the iSCSI storage access servers that should be used for access to the logical volumes. This data processing system architecture is efficient because a small fraction of the workload is handled by the metadata server, and a single compute node may access multiple storage access servers in parallel. Thus, a file can be striped across multiple iSCSI LUNs, and a compute node may read or write to each of these iSCSI LUNs concurrently by sending iSCSI I/O requests to respective iSCSI storage access server for accessing each of these LUNs.

What is claimed is:

1. In a data processing system having multiple compute nodes, at least one metadata server linked to the compute nodes for servicing requests from the compute nodes for file mapping information identifying iSCSI LUNs of data storage and logical blocks of file data within the iSCSI LUNs, a plurality of iSCSI storage access servers linked by a Gigabit Ethernet IP network to the compute nodes for servicing iSCSI I/O requests from the compute nodes for access to the logical blocks of file data, and a storage area network linking the iSCSI storage access servers to multiple data storage devices for servicing requests from the compute nodes for parallel access to specified iSCSI LUNs of the file data in the data storage devices, a method comprising:
the iSCSI storage access servers reporting to the metadata server loading of the iSCSI I/O requests from the compute nodes upon the iSCSI storage access servers; and
the metadata server balancing the loading of the iSCSI I/O requests from the compute nodes upon the iSCSI storage access servers by indicating to the compute nodes respective ones of the iSCSI storage access servers that should be used for access to the iSCSI LUNs.

2. The method as claimed in claim 1, which includes each iSCSI storage access server reporting to said at least one metadata server remaining capacity of data transfer bandwidth between the compute nodes and said each iSCSI storage access server, and remaining capacity of disk storage access rate of said each iSCSI storage access server.

3. The method as claimed in claim 1, which includes said at least one metadata server responding to a request from at least one of the compute nodes for the opening of a file by indicating to said at least one of the compute nodes at least one iSCSI LUN for containing data of the file and a respective one of the iSCSI storage access servers that should be used for accessing said at least one iSCSI LUN for containing data of the file.

4. The method as claimed in claim 1, which includes said at least one metadata server sending to at least one of the compute nodes a capacity allocation of an indicated iSCSI storage access server for servicing iSCSI I/O requests from said at least one of the compute nodes to the indicated iSCSI storage access server, and said at least one of the compute nodes throttling iSCSI I/O requests to the indicated iSCSI storage access server so as not to exceed the capacity allocation of the indicated iSCSI storage access server for servicing iSCSI I/O requests from said at least one of the compute nodes to the indicated iSCSI storage access server.

5. The method as claimed in claim 1, which includes at least one of the compute nodes bunching iSCSI I/O requests in an Internet Protocol (IP) pipe to one of the iSCSI storage access servers indicated by the metadata server as the iSCSI storage access server that should be used for access to iSCSI LUNs being accessed by the iSCSI I/O requests.

6. The method as claimed in claim 1, which includes at least one of the iSCSI storage access servers exporting, to clients on an access control list for an iSCSI LUN, a file system mounted as read-only on said at least one of the iSCSI storage access servers and containing metadata of the iSCSI LUN.

7. The method as claimed in claim 1, which includes said at least one metadata server responding to a request from at least one of the compute nodes for allocation of an iSCSI LUN of storage to said at least one of the compute nodes by returning to said at least one of the compute nodes a volume ID identifying the iSCSI LUN of storage allocated to said at least one of the compute nodes and by also returning an indication of a respective one of the iSCSI storage access servers that should be used for accessing the iSCSI LUN of storage allocated to said at least one of the compute nodes.

8. The method as claimed in claim 7, which further includes said at least one of the compute nodes sending to said at least one metadata server a request for re-assignment of a respective one of the iSCSI storage access servers that should be used for accessing the iSCSI LUN of storage allocated to said at least one of the compute nodes, and said at least one metadata server responding by the metadata server indicating another one of the iSCSI storage access servers having more remaining capacity for servicing read and write access to the iSCSI LUN of storage allocated to said at least one of the compute nodes.

9. The method as claimed in claim 1, which further includes said at least one metadata server detecting an overload of one of the iSCSI storage access servers and requesting at least one of the compute nodes having been instructed to use said at least one of the iSCSI storage access servers for read and write access to file data to use another one of the iSCSI storage access servers for read and write access to the file data instead.

10. A data processing system comprising, in combination:
multiple compute nodes,
  at least one metadata server linked to the compute nodes for servicing requests from the compute nodes for file mapping information identifying iSCSI LUNs of data storage and logical blocks of file data within the iSCSI LUNs;
  a plurality of iSCSI storage access servers coupled to the compute nodes for servicing iSCSI I/O requests from the compute nodes for access to the logical blocks of file data, and coupled to the metadata server for reporting iSCSI storage access server loading information to the metadata server;
  at least one Gigabit Ethernet IP network linking the compute nodes to the iSCSI storage access servers for transferring read and write data between the compute nodes and the iSCSI storage access servers; and
  multiple data storage devices for storing the file data, and a storage area network linking the iSCSI storage access servers to the multiple data storage devices for servicing requests from the compute nodes for parallel access to iSCSI LUNs of the file data in the data storage devices;
  wherein the iSCSI storage access servers are programmed for reporting to the metadata server loading of the iSCSI I/O requests from the compute nodes upon the iSCSI storage access servers; and
  the metadata server is programmed for balancing of loading of the iSCSI I/O requests from the compute nodes upon the iSCSI storage access servers by indicating to the compute nodes respective ones of the iSCSI storage access servers that should be used for access to the iSCSI LUNs.

11. The data processing system as claimed in claim 10, which includes a Fast Ethernet Internet Protocol (IP) network linking said at least one metadata server to the compute nodes for servicing the requests from the compute nodes for the file mapping information identifying the iSCSI LUNs of data storage and the logical blocks of file data within the iSCSI LUNs, and coupling the plurality of iSCSI storage access servers to the metadata server for reporting the iSCSI storage access server loading information to the metadata server.

12. The data processing system as claimed in claim 10, wherein each of the compute nodes is programmed with an Internet Protocol Small Computer System Interface (iSCSI) initiator for using iSCSI commands transmitted through said at least one Gigabit Ethernet IP network for accessing iSCSI logical unit numbers (LUNs) of the logical volumes.

13. The data processing system as claimed in claim 10, wherein each iSCSI storage access server is programmed to report to said at least one metadata server remaining capacity of data transfer bandwidth between the compute nodes and said each iSCSI storage access server, and remaining capacity of disk storage access rate of said each iSCSI storage access server.

14. The data processing system as claimed in claim 10, wherein said at least one metadata server is programmed for responding to a request from at least one of the compute nodes for the opening of a file by indicating to said at least one of the compute nodes at least one iSCSI LUN for containing data of the file and a respective one of the iSCSI storage access servers that should be used for accessing said at least one iSCSI LUN for containing data of the file.

15. The data processing system as claimed in claim 10, wherein said at least one metadata server is programmed to send to at least one of the compute nodes a capacity allocation of the indicated iSCSI storage access server for servicing iSCSI I/O requests from said at least one of the compute nodes to the indicated iSCSI storage access server, and wherein said at least one of the compute nodes is programmed to throttle iSCSI I/O requests to the indicated iSCSI storage access server so as not to exceed the capacity allocation of the indicated iSCSI storage access server for servicing iSCSI I/O requests from said at least one of the compute nodes to the indicated iSCSI storage access server.

16. The data processing system as claimed in claim 10, wherein at least one of the compute nodes is programmed for bunching iSCSI I/O requests in an Internet Protocol (IP) pipe to one of the iSCSI storage access servers indicated by the metadata server as the iSCSI storage access server that should be used for access to an iSCSI LUN being accessed by the iSCSI I/O requests.

17. The data processing system as claimed in claim 10, wherein at least one of the iSCSI storage access servers is programmed for exporting, to clients on an access control list for accessing an SCSI LUN, a file system containing metadata of the iSCSI LUN and mounted as read-only on said at least one of the iSCSI storage access servers.

18. The data processing system as claimed in claim 10, wherein said at least one metadata server is programmed for responding to a request from at least one of the compute nodes for allocation of an iSCSI LUN to said at least one of the compute nodes, and for returning to said at least one of the compute nodes a volume ID identifying the iSCSI LUN of storage allocated to said at least one of the compute nodes and for also returning an indication of a respective one of the iSCSI storage access servers that should be used for accessing the iSCSI LUN allocated to said at least one of the compute nodes.

19. A data processing system comprising, in combination:
  multiple compute nodes, each of the compute nodes being programmed for executing a respective internal application program and being programmed with a file mapping protocol (FMP) client for responding to requests from the internal application program for access to files;
  at least one metadata server linked to the compute nodes via an Internet Protocol (IP) network for servicing requests from the file mapping protocol (FMP) clients for file mapping information identifying iSCSI LUNs of data storage and logical blocks of file data within the iSCSI LUNs;
  a plurality of iSCSI storage access servers and at least one Gigabit Ethernet network coupling the iSCSI storage access servers to the compute nodes for servicing iSCSI I/O requests from the file mapping protocol (FMP) clients for access to the logical blocks of file data, the iSCSI storage access servers being coupled via the Internet Protocol (IP) network to the metadata server for reporting iSCSI storage access server loading information to the metadata server; and
  multiple data storage devices for storing the file data, and a storage area network linking the iSCSI storage access servers to the multiple data storage devices for servicing requests from the compute nodes for parallel access to iSCSI LUNs of the file data in the data storage devices;
  wherein the iSCSI storage access servers are programmed for reporting to the metadata server loading of the iSCSI I/O requests from the compute nodes upon the iSCSI storage access servers; and
  wherein the metadata server is programmed for balancing of loading of the iSCSI I/O requests from the file mapping protocol (FMP) clients upon the iSCSI storage access servers by indicating to the file mapping protocol (FMP) clients respective iSCSI storage access servers that should be used for access to the iSCSI LUNs.

20. The data processing system as claimed in claim 19, wherein said at least one metadata server is programmed to send to at least one of the file mapping protocol (FMP) clients a capacity allocation of an indicated one of the iSCSI storage access servers for servicing iSCSI I/O requests from said at least one of the file mapping protocol (FMP) clients to the indicated one of the iSCSI storage access servers, and wherein said at least one of the file mapping protocol (FMP) clients is programmed to throttle iSCSI I/O requests to the indicated one of the iSCSI storage access servers so as not to exceed the capacity allocation of the indicated one of the iSCSI storage access servers for servicing iSCSI I/O requests from said at least one of the file mapping protocol (FMP) clients to the indicated one of the iSCSI storage access servers.

* * * * *